Oct. 18, 1932.  G. G. GUTHRIE  1,882,661
TIRE PRESSURE ALARM OPERATING MEANS
Filed Aug. 6, 1930   3 Sheets-Sheet 1
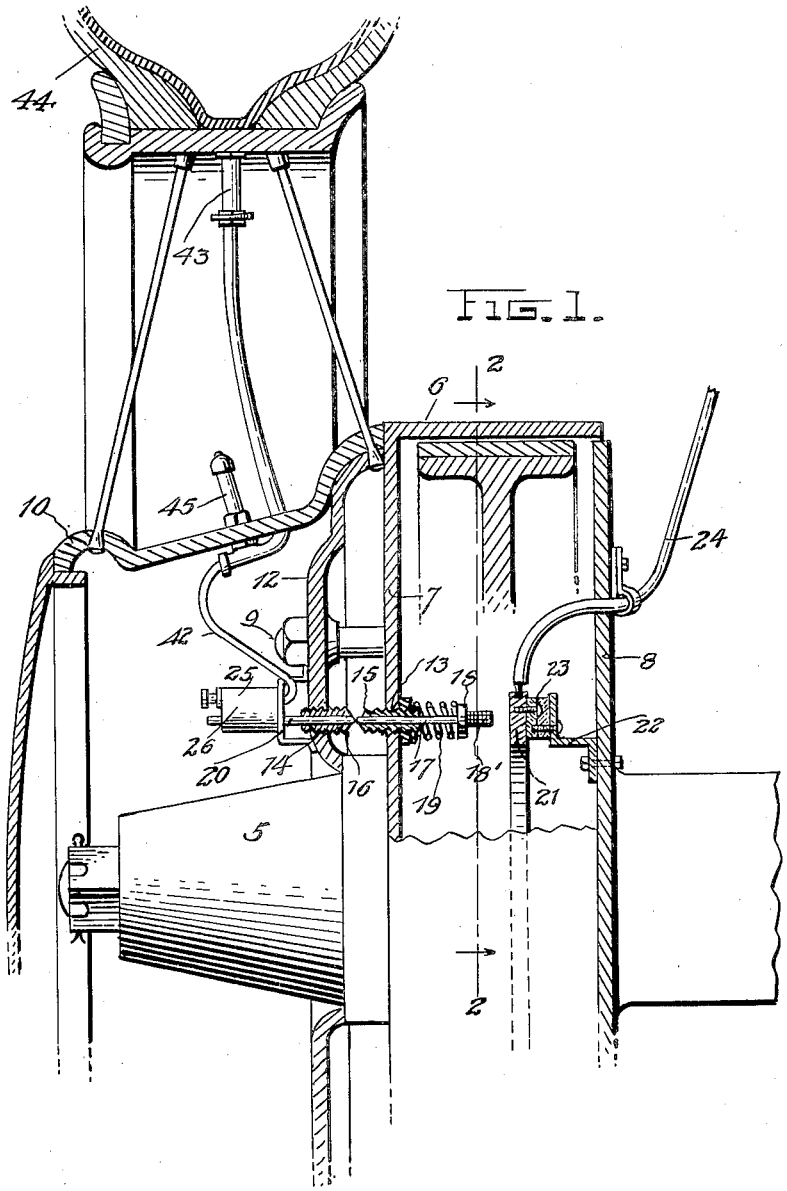
Inventor
G. G. Guthrie Oct. 18, 1932.  G. G. GUTHRIE  1,882,661
TIRE PRESSURE ALARM OPERATING MEANS
Filed Aug. 6, 1930    3 Sheets-Sheet 2
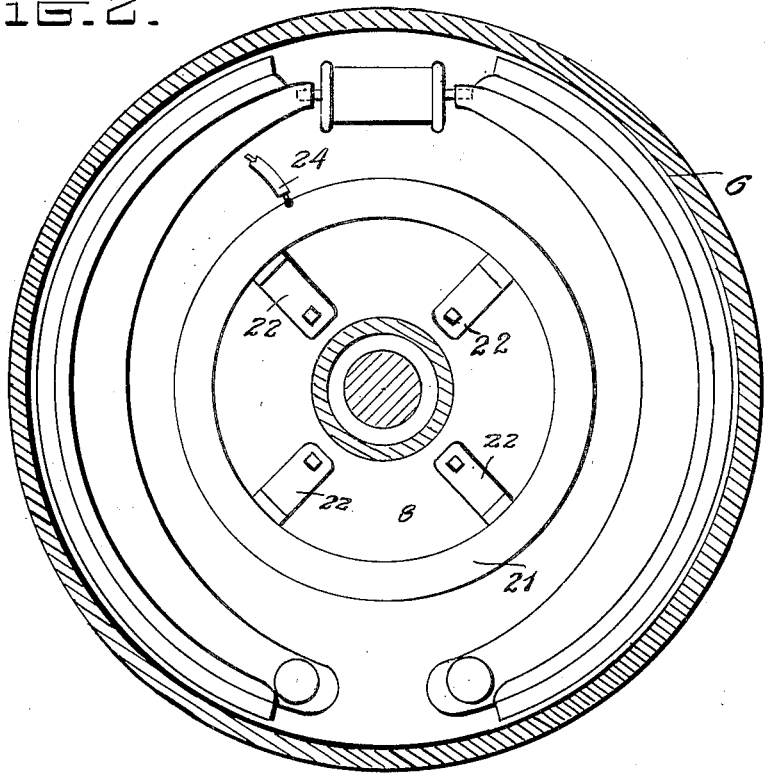
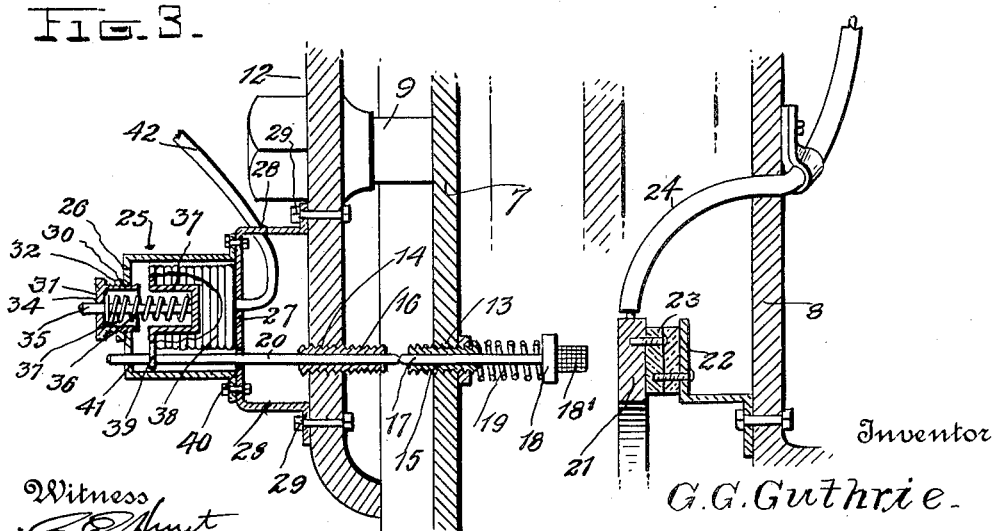
Inventor
G. G. Guthrie

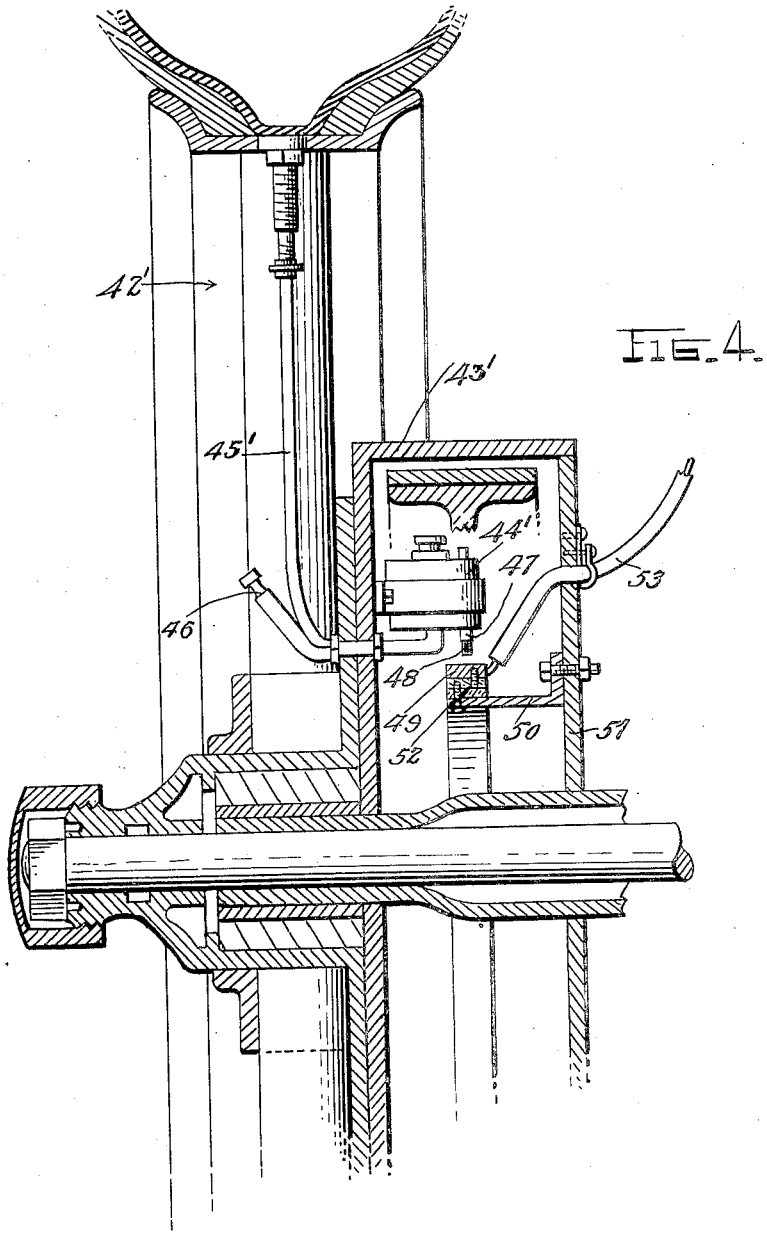

Patented Oct. 18, 1932

1,882,661

UNITED STATES PATENT OFFICE

GEORGE G. GUTHRIE, OF TULSA, OKLAHOMA

TIRE PRESSURE ALARM OPERATING MEANS

Application filed August 6, 1930. Serial No. 473,471.

The invention relates to improvements in pressure alarms for automobile and other vehicle tires, of a general type in which abnormal pressure actuates a movable wheel-carried contact for completing an alarm circuit, whenever the tire pressure lowers below a predetermined extent. An annular stationary contact is provided for coaction with the pressure-moved contact, and it is the principal object of the present invention to provide a new and improved construction wherein the annular fixed contact and the pressure-moved wheel-carried contact, are normally out of engagement with each other to prevent wear, but are immediately brought into conducting engagement with each other upon predetermined diminution of pressure in the tire.

Obviously, the invention may be employed in connection with any or all tires of any type of vehicle and may be made to complete an alarm circuit for any desired type or types of visible or audible alarms, or both. As the present invention however relates solely to the alarm operating means, the disclosure will be confined thereto without any showing of alarm.

With the foregoing in view, the invention resides in the novel subject matter hereinafter described and claimed, description being accomplished by reference to the accompanying drawings.

Fig. 1 is a sectional view through a portion of a demountable wire spoke wheel and associated parts, showing the invention applied thereto.

Fig. 2 is a vertical sectional view on line 2—2 of Fig. 1.

Fig. 3 is an enlarged vertical sectional view through the invention shown on a smaller scale in Fig. 1.

Fig. 4 is a sectional view showing a different form of construction adapted to a different wheel structure.

In the construction shown in Figs. 1, 2 and 3, the numeral 5 denotes a wheel-carried hub to which a brake drum 6 is secured, said brake drum having the usual outer wall 7 secured to the hub. The inner side of the brake drum is closed by the conventional axle-carried stationary plate 8. Removably engaged with the hub 5 and secured in place by the conventional bolts 9, is the hollow hub 10 of a demountable wire spoke wheel 11, said hub 10 being provided with an inner side wall 12 spaced outwardly from the side wall 7 of the brake drum 6. The two walls 7 and 12 are provided with alined openings 13 and 14 respectively, in which metal guide tubes 15 and 16 are secured in any desired way. Slidable in the tube 16 is a metal contact pin 17 whose inner end 18 is preferably in the form of a wire gauze brush 18'. A coiled tension spring 19 is connected at one end with the pin 17 and at its other end to the wall 7 or an associated part, said spring normally holding the pin 17 in a position toward the outer side of the wheel 11. Slidable in the guide 14 and abutting the outer end of the pin 17 is a second pin 20 which serves in a manner hereinafter described, to inwardly slide the pin 17 upon predetermined decrease of tire pressure. When pin 17 is inwardly moved in this manner, its brush 18' contacts with a metal contact ring 21 to complete an alarm circuit, said ring 21 being carried by brackets 22 secured to the plate 8, the ring and bracket being insulated from each other by appropriate means 23. 24 denotes an insulated conductor electrically connected in any desired way with the ring 21 and forming part of the alarm circuit, it being of course understood that other parts of such circuit are formed by metallic portions of the vehicle.

An operating unit 25, for the pin 20, is mounted within the hub 10 and is constructed as shown in Fig. 3. A casing 26 embodies a removable end wall 27 having legs 28 secured by bolts 29 to the hub wall 12. The other end wall of the casing 26 is provided with a threaded opening 30 into which a screw 31 is threaded, the part 32 being a lock nut for said screw. This screw is provided at its inner end with a recess 33 and is formed with an opening 34 from its outer end into said recess. The outer end of a pin 35 is slidably received in the opening 34 and the outer end of a coiled compression spring 36 is received in the recess 33. The inner end of the pin 35 is secured in and the inner end of the spring 36 is seated in a recess 37 in the free end of a tubular metal bellows 38, the other end of this bellows being secured to the plate 27. Part of this bellows is shown in elevation and part in section in Fig. 3, the bellows being too small to properly illustrate its corrugated peripheral wall in section. The free end of the bellows is provided with a lateral arm 39 which is secured to the pin 20 near the outer end of the latter, said pin being slidable in openings 40 and 41 which are formed in the inner and outer ends of the casing 26. A suitable air-conducting tube 42 connects the inner end of the bellows 38 with the inflation valve 43 of the wheel tire 44, said tube being itself provided with an inflation valve 45 so that it is unnecessary to disconnect the tube from the valve 43 when inflating the tire.

The bellows 38 is of course normally extended by the pressure reaching it from the tire 44 and hence the spring 36 is held under compression, the rod 20 is held in an outer position, and the contact pin 17 is held away from the ring 21 by the spring 19, overcoming wear which would take place if said pin were always in contact with the ring 21. Upon sufficient decrease of pressure in the tire 44 from any cause, the spring 36 overcomes the pressure in the bellows 38 and consequently contracts the latter, thereby forcing the pins 20 and 17 inwardly and bringing the brush 18' of said pin 17 against the contact ring 21. Thus, the circuit for the alarm or alarms may be completed and warning given at the time pressure is low.

When the parts 18 and 21 are in contact, it may be explained, that current flows from the source through the alarm or alarms, through the conductor 24, through the parts 21, 18, 17 and 15 to the wall 7, through this wall, the hub 5, the axle and axle bearings, etc., to the frame of the machine and through this frame back to the source.

In Fig. 4, the invention is shown in connection with a wood spoke wheel 42'. Mounted in the brake drum 43' of this wheel to rotate therewith, is a unit 44' which is practically identical with the unit 25 above described, the encased bellows of said unit 44' being in communication with the wheel tire by means of a tube 45' having an inflation valve 46. The pin 47 corresponds to the pin 20 and is operated by the unit 44', the inner end of said pin being provided with a brush 48. Pin 47 is disposed radially of the wheel, between the peripheral wall of the drum 43' and a contact ring 49. This ring is carried by brackets 50 secured to the fixed plate 51, said ring being insulated from said brackets as denoted at 52. A conducting wire 53 is connected with the ring 49.

Normally the unit 44' holds the pin 47 in such position that its brush 48 is out of contact with the ring 49. Upon sufficient decrease in tire pressure however, said unit allows engagement of brush 48 with the ring 49, thereby completing the alarm circuit through the conductor 53 and alarm, the source of current, and the various metal machine parts which may be used as current conductors.

While preferred features of construction have been illustrated, and the invention has been shown on only two types of wheels, it is to be understood that variations may be made and moreover that the invention can be successfully used on wheels of all standard types.

I claim:—

1. In a current conducting assemblage for an automobile in which a hub shell is demountable from an axle-carried hub; a slidable conducting pin carried by said hub, a spring acting on said pin and urging it toward the outer end of said hub, and a spring-operated pressure-held actuator for inwardly sliding said pin against the action of said spring, said actuator abutting the outer end of said pin and being carried by said hub shell; whereby upon demounting said shell from said hub, the actuator will separate from the pin.

2. In a current conducting assemblage for an automobile in which a hub shell is demountable from an axle-carried hub; alined abutting pins slidably carried one by said shell and the other by said hub, a relatively weak spring acting on the hub-carried pin and urging both pins toward the outer end of the hub, a relatively strong spring acting on said shell-carried pin and capable of sliding both pins inwardly against the influence of said relatively weak spring, and pressure-responsive means acting on said shell-carried pin for normally overcoming the strength of said relatively strong pin; said pins being separable upon demounting of the hub shell from the hub.

3. In a current conducting assemblage for an automobile in which a hub shell provided with a closure plate is demountable from a hub which carries a second plate opposite said closure plate, and in which a non-rotatable axle-carried plate is spaced inwardly from said second plate; alined tubular guides carried by and extending through said closure plate and said second plate respectively, two alined abutting pins slidable in said guides respectively, a fixed contact carried by said non-rotatable plate in the inward path of the innermost of said pins, a relatively weak spring acting on said innermost pin and urging both pins toward the outer end of the hub to normally separate said innermost pin from said fixed contact, a relatively strong spring acting on the outermost of said pins and capable of inwardly sliding both of said pins against the influence of said relatively strong spring, and pressure-responsive means acting upon said outermost pin for normally overcoming the strength of said relatively strong pin; said pins being separable upon demounting of the hub shell from the hub.

4. In a device of the class described, a casing having a screw-receiving opening in one end and alined pin-guiding openings in its opposite ends, a screw threaded in said screw-receiving opening, said screw having a recess in its inner end and an opening from its outer end to said recess, a tubular metal bellows secured at one end within said casing and having a free end presented toward said screw, said free bellows end having a recess opposed to the recess of said screw, a coiled compression spring received in said recesses, a bellows guiding pin within said spring secured to the bellows and passing slidably through said opening of the screw, a pin passing slidably through the aforesaid alined pin-guiding openings, and a connection between this pin and said free end of the bellows.

In testimony whereof I affix my signature.

GEORGE G. GUTHRIE.